(12) United States Patent
Lund et al.

(10) Patent No.: US 6,820,840 B2
(45) Date of Patent: Nov. 23, 2004

(54) HYDROGEN POWERED TOY ROCKET UTILIZING HYDROGEN FROM THE ELECTROLYSIS OF WATER

(75) Inventors: Bruce D. Lund, Chicago, IL (US); Michael Starrick, Maywood, IL (US)

(73) Assignee: Lund and Company Invention LLC, Chicago, IL (US)

(*) Notice: Subject to any disclaimer, the term of this patent is extended or adjusted under 35 U.S.C. 154(b) by 0 days.

(21) Appl. No.: 10/348,830

(22) Filed: Jan. 22, 2003

(65) Prior Publication Data

US 2004/0159740 A1 Aug. 19, 2004

Related U.S. Application Data

(60) Provisional application No. 60/353,161, filed on Jan. 30, 2002.

(51) Int. Cl.[7] .................................................. B64F 1/04
(52) U.S. Cl. .......................................... 244/63; 124/71

(58) Field of Search ............... 244/63, 169; 124/73–77, 124/71; 60/203; 89/7; 204/262; 446/56, 52

(56) References Cited

U.S. PATENT DOCUMENTS

| | | | | |
|---|---|---|---|---|
| 1,620,994 A | * | 3/1927 | Bustamante | |
| 3,490,235 A | * | 1/1970 | Grant | 60/203 |
| 4,345,729 A | * | 8/1982 | Barter | 244/169 |
| 4,664,631 A | * | 5/1987 | Pederson et al. | 89/7 |
| 5,399,251 A | * | 3/1995 | Nakamats | 204/262 |
| 6,321,737 B1 | * | 11/2001 | Johnson et al. | 124/73 |

* cited by examiner

Primary Examiner—Galen Barefoot

(57) ABSTRACT

A toy rocket assemblage including a tank containing water and an anode and cathode in the tank and a power supply for said anode and cathode to generate oxygen and hydrogen in the tank. A toy rocket in a chamber exposed to the oxygen and hydrogen gasses and an igniter for igniting the oxygen and hydrogen mixture to drive the rocket into the atmosphere.

12 Claims, 4 Drawing Sheets

HYDROGEN POWERED TOY ROCKET UTILIZING HYDROGEN FROM THE ELECTROLYSIS OF WATER

This is a continuation of provisional application 60/353,161 filed Jan. 30, 2002 entitled Toys and Power Driven Equipment Utilizing Hydrogen from the Electrolysis of Water.

BACK GROUND OF THE INVENTION

It is well known to use electrolysis to separate water into its hydrogen and oxygen components. However, the designing and building of a reusable toy rocket assemblage using the components of electrolysis has always been believed to be unattainable and uneconomical and thus while desirable has eluded legions of designers and developers.

SUMMARY OF THE INVENTION

In accordance with the present invention there has been developed a novel toy system that uses simple and inexpensive sources of power and ignition systems to bring about the electrolysis of water and ignite the hydrogen component and capture the explosive power obtained therefrom to power a toy rocket. The power generated is directed in a simple, and efficient and safe manner to drive the toy rocket.

Other features and advantages will be apparent from the following drawings and descriptions thereof in which;

FIG. 1 is a cross-sectional view of a toy rocket launcher illustrating the condition of the system wherein the power has been turned on and through electrolysis oxygen and hydrogen gases are being produced in the same or separate chambers;

FIG. 2 illustrates a selection valve being operated to transfer oxygen to the launch tube over which the toy rocket is disposed;

FIG. 3 illustrates a selection valve being operated to transfer hydrogen to the launch tube; and FIG. 4 illustrates a successful launch of the rocket.

The membrane mesh would allow for constant flow of fluid but the mesh is small enough to keep the hydrogen and oxygen bubbles within their single chamber. Mesh is not necessary when a single chamber is employed. It is further noted that citric acid could be added to accelerate electrolysis.

Figure 1:
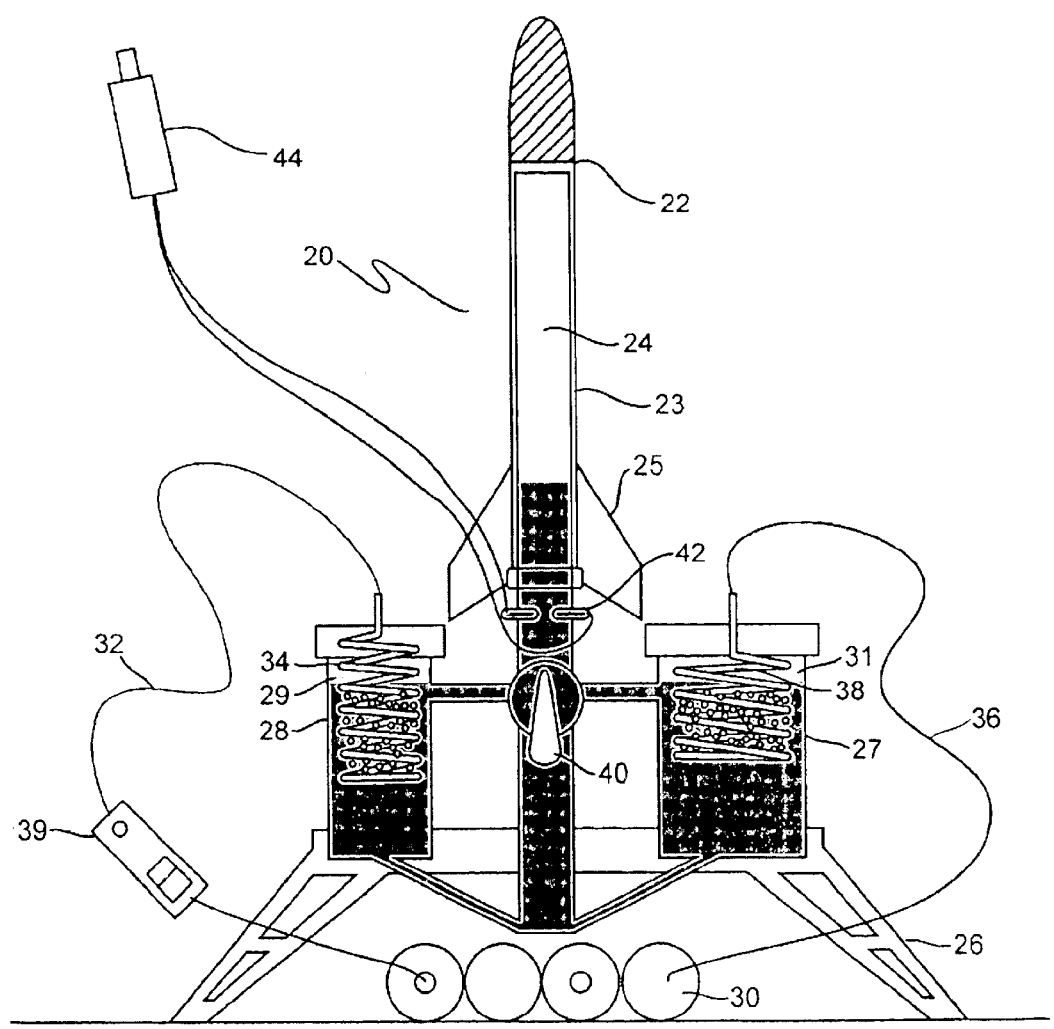
Referring to FIG. 1 there is illustrated a toy rocket launcher assembly 20 on which a rocket 22 is disposed over a launch tube 24 prior to firing. The rocket has a tubular housing 23 that fits over the launch tube 24 and fins 25 that helps to guide the rocket during flight. In the illustrated embodiment the launcher 20 includes a base 26 on which is mounted a chamber 27 in which hydrogen is generated and a chamber 28 in which oxygen is generated. Both chambers 27 and 28 are filled with water from a suitable source (not shown). The base 26 also includes a battery pack 30 that supplies power through wire 32 to an anode 34 in the water filled oxygen chamber 28 and through wire 36 to cathode 38 in the hydrogen chamber 27. A power switch 39 controls the flow of electricity to the anode 34 and the cathode 38. While separated chambers has been illustrated the anode and the cathode can be located inside a single chamber and if separation is desired the electrodes could be separated by a permeable membrane.
Figure 2:
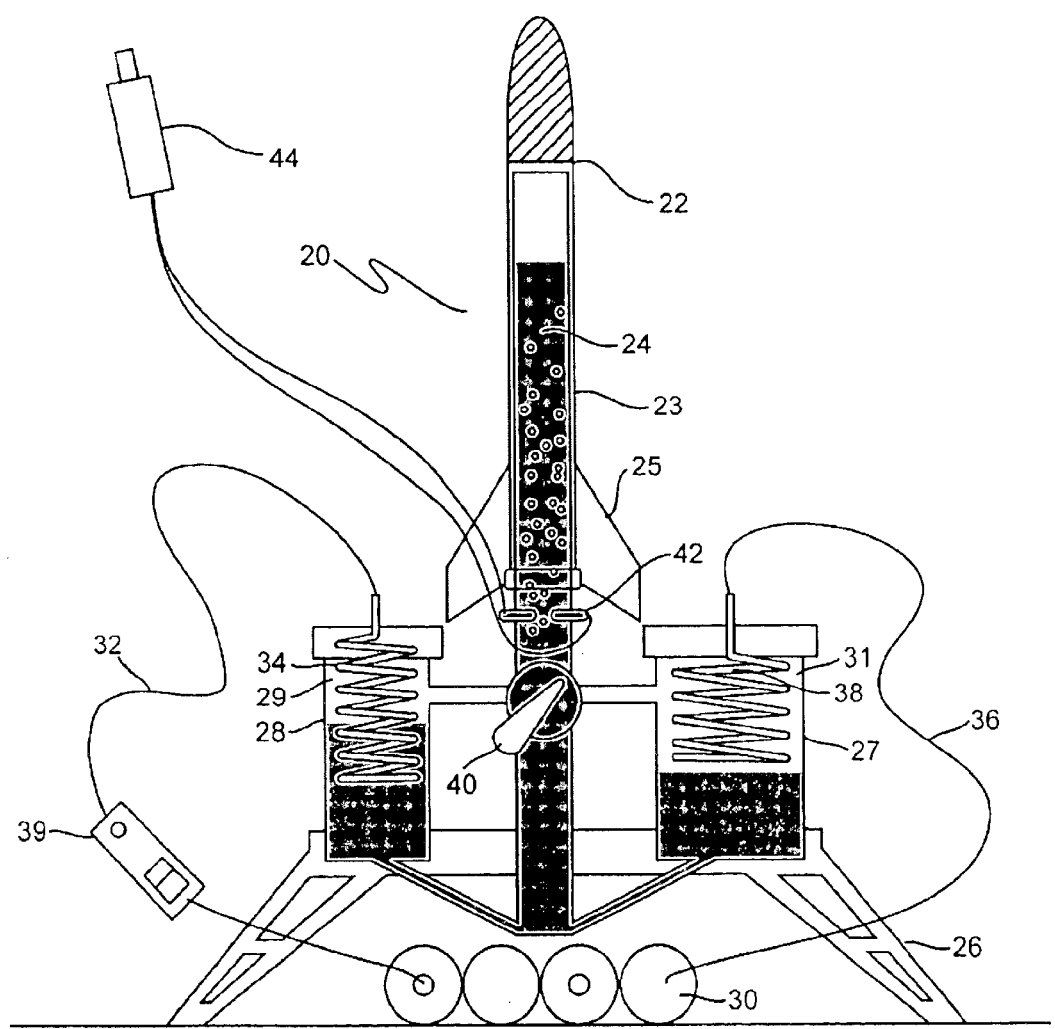
Figure 3:
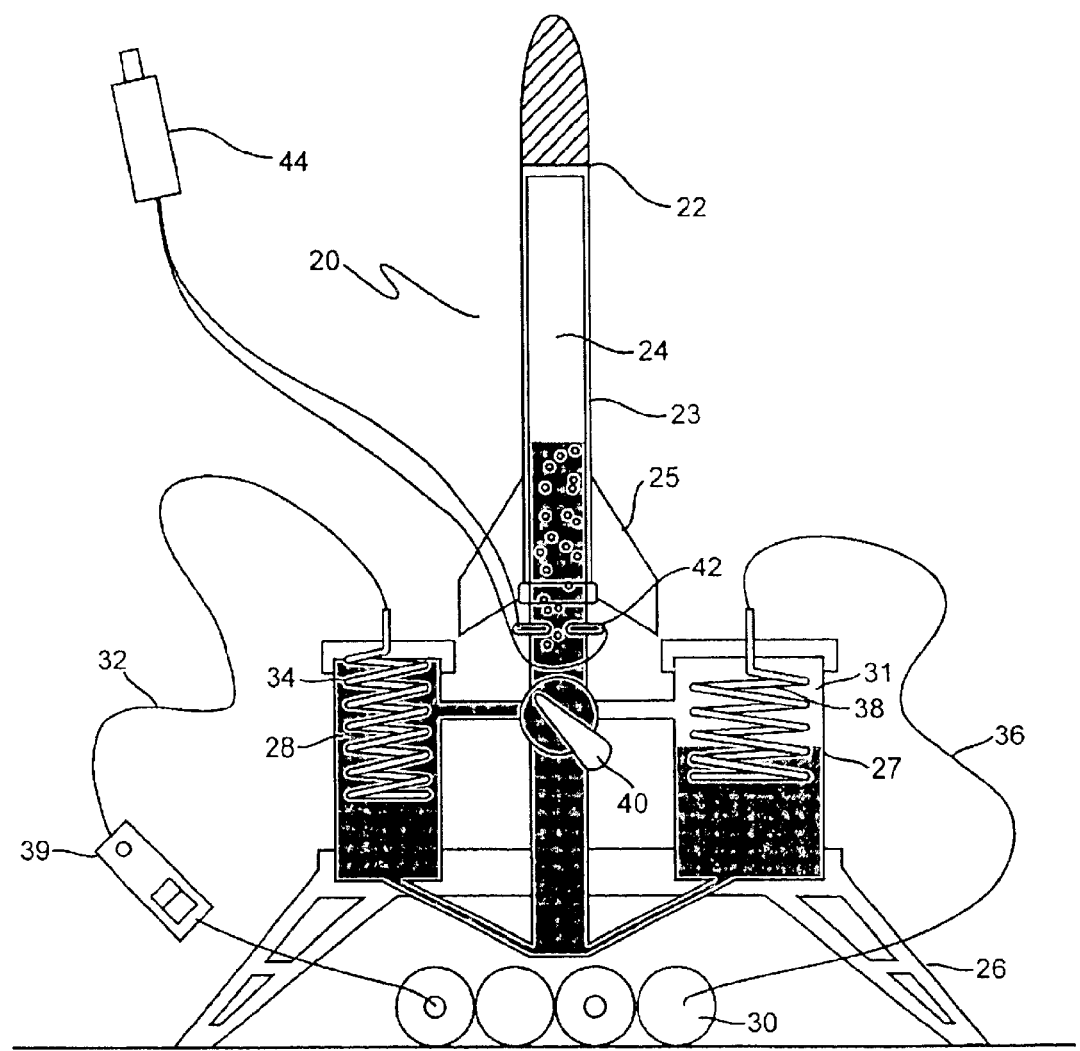
Figure 4:
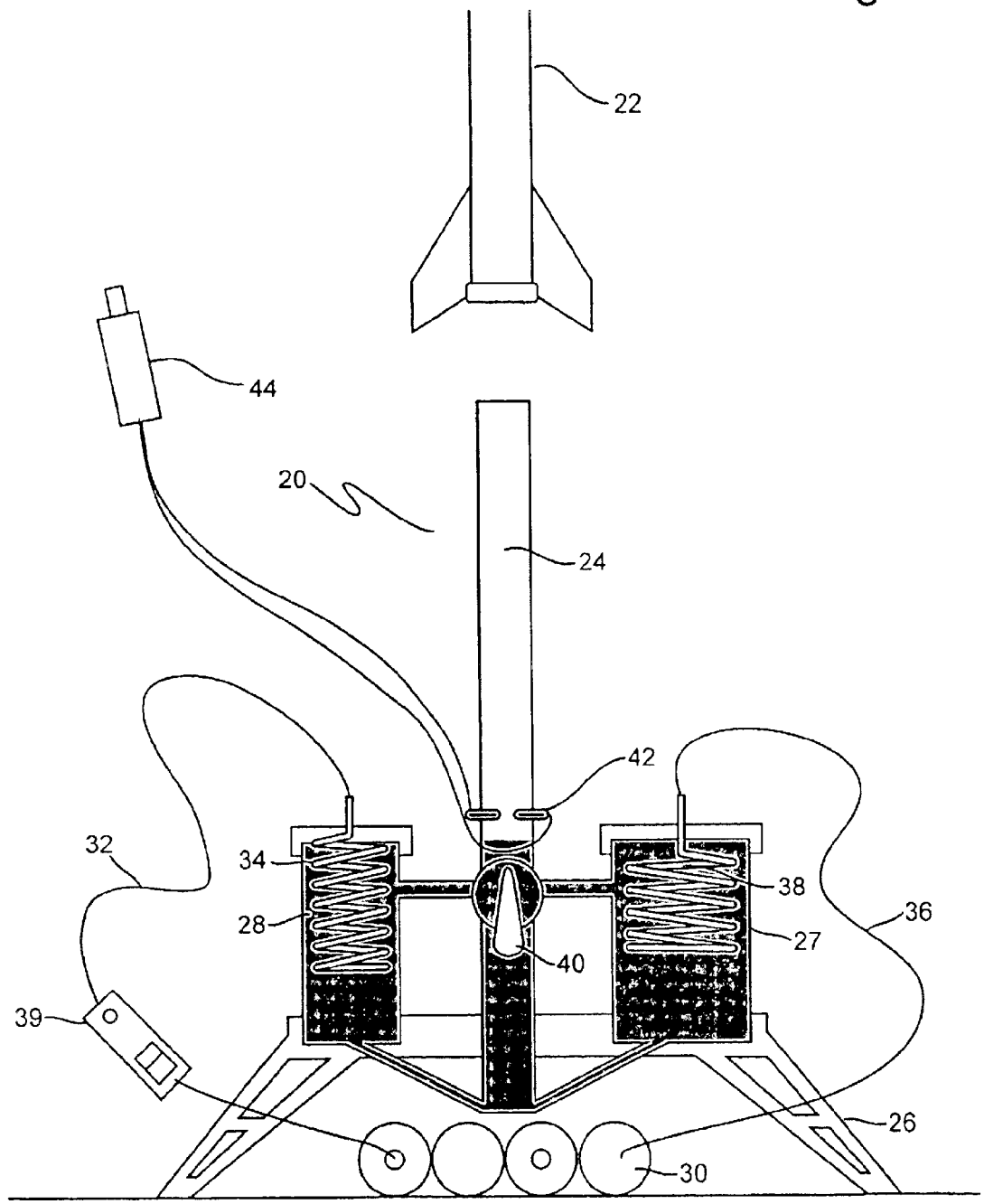

In FIG. 1 the system is in an intermediate stage wherein the selection valve 40 is in a neutral position and the power switch 39 is turned on to start the electrolysis that functions to provide oxygen gas 29 in chamber 28 and hydrogen gas 31 in chamber 27. With the selection valve 40 in the neutral position some water is in the launch tube 24 and the rocket 22 surrounds and sits atop the launch tube 24. The selection valve 40 is then moved to the right as shown in FIG. 2 to admit oxygen gas 29 and some water to the launch tube 24 from the chamber 28 and then when selection valve 40 is moved to the left as shown in FIG. 3 to introduce hydrogen gas 31 to the launch tube 24. The hydrogen and oxygen gases under pressure in the launch tube 24 forces the water roughly into the position shown in FIG. 1 except that the launch tube is filled with an explosive hydrogen and oxygen gas mixture. The arc electrodes 42 are surrounded by the hydrogen and oxygen gases and the piezo igniter 44 generates a spark and the gas mixture explodes with a large force to launch the rocket 22 as shown in FIG. 4. In this position the selection valve 40 has been returned to the neutral position and the chambers 27 and 28 refilled with water. This process can be repeated and provides an endless source of enjoyment for the user.

In another embodiment within the scope of the invention the system would include a single chamber that holds the cathode and anode wherein the oxygen and hydrogen gases are generated through electrolysis. This embodiment would also include a battery pack for the power for the electrolysis and electrodes for ignition. The unit would be operated by a remote control having an on/off and igniter switches.

It is intended to cover by the appended claims all changes and embodiments which fall within the true spirit and scope of the invention.

What is claimed is:

1. A toy rocket assemblage including a pair of tanks, containing a water solution, a cathode in one of said tanks and an anode in the other of said tanks, power;

means for said anode and cathode to bring about electrolysis to generate hydrogen gas in the tank containing the cathode and oxygen gas in the tank containing the anode, a launch tube in communication with said tanks to receive the hydrogen and oxygen gases, a hollow rocket disposed over said launch tube and defining a chamber for receiving the mixture of the oxygen and hydrogen gases, means for igniting the gases in said launch tube to generate an explosive force to drive the rocket off said launch tube into the atmosphere.

2. A toy rocket assemblage as set forth in claim 1 in which the power source for said anode and cathode is a battery pack disposed adjacent said tank means.

3. A toy rocket assemblage as set forth in claim 1 in which the ignition means for said gases is a set of arc electrodes in said launch tube which electrodes receive power from a piezo ignition connected thereto.

4. A toy rocket assemblage as set forth in claim 3 in which each of the tank means are connected to the launch tube by conduit means that is controlled by a selection valve which valve moves between a closed position to in one position to regulate the flow of oxygen gas to the launch tube and to another position to regulate the flow of hydrogen to the launch tube.

5. A toy rocket assemblage as set forth in claim 4 whereby the tank, launch tube and rocket are supported on a launching pad.

6. A toy rocket assemblage including a self-contained tank means, an anode and a cathode in said tank means, a power supply for said anode and cathode to generate oxygen and hydrogen in said tank means, a launch tube in communication with said tank means to receive hydrogen and oxygen gases therefrom, a toy rocket disposed over said launch tube, and igniting means for exploding said oxygen and hydrogen mixture too drive said rocket off of said launch tube into the atmosphere.

7. A toy rocket assembly as set forth in claim 6 in which the launch tube includes a plenum that receives said hydrogen and oxygen gases, and the rocket includes a tubular portion that fits over the launch tube so that when the gases are ignited the explosion propels the rocket into the atmosphere off of said launch tube.

8. A toy rocket as set forth in claim 6 in which the anode and cathode are disposed in a single chamber.

9. A toy rocket assemblage as set forth in claim 6 in which the launch tube defines a plenum chamber into which the hydrogen and oxygen flows and the ignition means includes a pair of electrodes extending into said plenum and a piezo igniter for actuating said electrodes to ignite the mixture of oxygen and hydrogen gases in said plenum to propel the rocket into the atmosphere off of said launch tube.

10. A toy rocket assemblage including a frame means, tank means supported by said frame means, an anode and a cathode in said tank means, a power supply means in said frame means for supplying power to the anode and cathode to bring about the electrolysis of the water solution in said tank means to form oxygen and hydrogen, a launch tube supported by said frame means and defining a chamber in communication with the oxygen and hydrogen generated in said tank means, electrodes extending into said chamber, a rocket disposed over said launch tube, and power means for igniting said electrodes for creating an explosive mixture of said hydrogen and oxygen to drive the rocket off of said launch tube into the atmosphere.

11. A toy rocket assemblage as set forth in claim 10 in which the tank means include two separate tanks with the anode in one of said tanks and the cathode in the other of said tanks and the tank means are connected to the launch tube by conduit means that is controlled by a selection valve that controls the flow of oxygen and hydrogen to said chamber.

12. A toy rocket assemblage as set forth in claim 11 in which the power supply for said anode and cathode is located in said frame means and the ignition of said electrodes is provided by a piezo igniter.

* * * * *